United States Patent
Lee et al.

(10) Patent No.: US 10,448,279 B2
(45) Date of Patent: Oct. 15, 2019

(54) METHOD AND APPARATUS FOR CONFIGURING TRANSMISSION MODE AND ROUTING FOR TIGHT INTERWORKING IN WIRELESS COMMUNICATION SYSTEM

(71) Applicant: LG ELECTRONICS INC., Seoul (KR)

(72) Inventors: Jaewook Lee, Seoul (KR); Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/325,395

(22) PCT Filed: Jul. 22, 2015

(86) PCT No.: PCT/KR2015/007638
§ 371 (c)(1),
(2) Date: Jan. 10, 2017

(87) PCT Pub. No.: WO2016/017988
PCT Pub. Date: Feb. 4, 2016

(65) Prior Publication Data
US 2017/0195918 A1    Jul. 6, 2017

Related U.S. Application Data

(60) Provisional application No. 62/030,030, filed on Jul. 28, 2014.

(51) Int. Cl.
*H04W 28/08*    (2009.01)
*H04W 88/06*    (2009.01)
*H04W 84/12*    (2009.01)

(52) U.S. Cl.
CPC ........... *H04W 28/08* (2013.01); *H04W 84/12* (2013.01); *H04W 88/06* (2013.01)

(58) Field of Classification Search
CPC ...... H04W 28/08; H04W 36/00; H04W 56/00
See application file for complete search history.

(56) References Cited

U.S. PATENT DOCUMENTS

| 6,965,575 B2 * | 11/2005 | Srikrishna | H04L 45/00 370/238 |
| 2008/0170522 A1 * | 7/2008 | Sammour | H04B 7/00 370/310 |

(Continued)

FOREIGN PATENT DOCUMENTS

| CN | 102215530 | 10/2011 |
| CN | 102811465 | 12/2012 |

(Continued)

OTHER PUBLICATIONS

3GPP TS 23.402, Technical Specification, Release 11.5.0, published in 2012.*

(Continued)

*Primary Examiner* — Mansour Oveissi
(74) *Attorney, Agent, or Firm* — Lee, Hong, Degerman, Kang & Waimey

(57) ABSTRACT

A method and apparatus for routing traffic in a wireless communication system is provided. A user equipment (UE) transmits information on the routing of the traffic to a network, and routes the traffic to at least one of 3rd generation partnership protocol (3GPP) long-term evolution (LTE) or wireless local area network (WLAN), according to the information on routing of the traffic. The information on the routing of the traffic may be a ratio of an amount of the traffic (Continued)

to be served by the 3GPP LTE and an amount of the traffic to be served by the WLAN, or a preferred WLAN throughput.

6 Claims, 12 Drawing Sheets

(56) References Cited

U.S. PATENT DOCUMENTS

| | | | |
|---|---|---|---|
| 2013/0064103 | A1 | 3/2013 | Koskela et al. |
| 2013/0083783 | A1* | 4/2013 | Gupta .................. H04W 4/70 370/338 |
| 2013/0088983 | A1* | 4/2013 | Pragada ............... H04W 16/14 370/252 |
| 2013/0163463 | A1* | 6/2013 | Grayson ............ H04L 43/0876 370/253 |
| 2014/0082697 | A1 | 3/2014 | Watfa et al. |
| 2014/0105003 | A1 | 4/2014 | Austin et al. |
| 2014/0199996 | A1 | 7/2014 | Wang et al. |
| 2015/0043336 | A1* | 2/2015 | Zhu .................. H04W 28/0268 370/230 |

FOREIGN PATENT DOCUMENTS

| | | |
|---|---|---|
| CN | 103547327 | 1/2014 |
| CN | 103582011 | 2/2014 |

OTHER PUBLICATIONS

ETSI TS 123.261, UMTS; LTE; IP Flow Mobility, Release 11.0.0, pubished 2012.*
From GSM to LTE, an introduction to Mobile Networks and Mobile Broadband, by Martin Sauter, 2011.*
ETSI TS 123.234, Release 11.0.0, published in 2012.*
Split-OSPF: A traffic engineering solution for OSPF based best effort networks (2007) by Aditya Mishra et Al.*
PCT International Application No. PCT/KR2015/007638, International Search Report dated Oct. 26, 2015, 2 pages.
Samsung, "AS/NAS modelling for WLAN/3GPP radio networking," R2-142214, 3GPP TSG-RAN2 Meeting #86, May 2014, 5 pages.
Chinese application No. 201580039579.5, Office Action dated Mar. 4, 2019, 6 pages.

* cited by examiner

METHOD AND APPARATUS FOR CONFIGURING TRANSMISSION MODE AND ROUTING FOR TIGHT INTERWORKING IN WIRELESS COMMUNICATION SYSTEM

CROSS-REFERENCE TO RELATED APPLICATIONS

This application is the National Stage filing under 35 U.S.C. 371 of International Application No. PCT/KR2015/007638, filed on Jul. 22, 2015, which claims the benefit of U.S. Provisional Application No. 62/030,030, filed on Jul. 28, 2014, the contents of which are all hereby incorporated by reference herein in their entirety.

BACKGROUND OF THE INVENTION

Field of the Invention

The present invention relates to wireless communications, and more particularly, to a method and apparatus for configuring a transmission mode and routing for tight interworking between 3rd generation partnership project (3GPP) long-term evolution (LTE) and wireless local area network (WLAN) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

3GPP/wireless local area network (WLAN) interworking has been discussed. 3GPP/WLAN interworking may be called traffic steering. From rel-8 of 3GPP LTE, access network discovery and selection functions (ANDSF) for detecting and selecting accessible access networks have been standardized while interworking with non-3GPP access (e.g., WLAN) is introduced. The ANDSF may carry detection information of access networks accessible in location of a user equipment (UE) (e.g., WLAN, WiMAX location information, etc), inter-system mobility policies (ISMP) which is able to reflect operator's policies, and inter-system routing policy (ISRP). Based on the information described above, the UE may determine which Internet protocol (IP) traffic is transmitted through which access network. The ISMP may include network selection rules for the UE to select one active access network connection (e.g., WLAN or 3GPP). The ISRP may include network selection rules for the UE to select one or more potential active access network connection (e.g., both WLAN and 3GPP). The ISRP may include multiple access connectivity (MAPCON), IP flow mobility (IFOM) and non-seamless WLAN offloading. Open mobile alliance (OMA) device management (DM) may be used for dynamic provision between the ANDSF and the UE.

The MAPCON is a standardization of a technology which enables configuring and maintaining multiple packet data network (PDN) connectivity simultaneously through 3GPP access and non-3GPP access, and enables a seamless traffic offloading in units of all active PDN connections. For this, an ANDSF server provides access point name (APN) information for performing offloading, routing rule, time of day information, and validity area information, etc.

The IFOM supports mobility in a unit of IP flow, which is more flexible and more segmented than the MAPCON, and seamless offloading. The IFOM enables access to different access networks even when the UE is connected to a PDN using the same APN, which is different from the MAPCON. The IFOM also enables mobility in a unit of specific IP traffic flow, not a unit of PDN, for a unit of mobility or offloading, and accordingly, services may be provided flexibly. For this, an ANDSF server provides IP flow information for performing offloading, routing rule, time of day information, and validity area information, etc.

The non-seamless WLAN offloading is a technology that offloads traffics completely so as not to go through the evolved packet core (EPC) as well as that changes a path of a specific IP traffic to WLAN. The offloaded IP traffic cannot be moved to 3GPP access seamlessly again since anchoring is not performed to the P-GW for mobility support. For this, an ANDSF server provides information as similar as the information provided for the IFOM.

Interworking between 3GPP and WLAN can be performed more tightly, which means that 3GPP and WLAN can be integrated in the level of radio protocol. Operations for tight interworking between 3GPP and WLAN may be required.

SUMMARY OF THE INVENTION

The present invention provides a method and apparatus for configuring a transmission mode and routing for tight interworking between 3rd generation partnership project (3GPP) long-term evolution (LTE) and wireless local area network (WLAN) in a wireless communication system. The present invention provides a method and apparatus for defining a new transmission mode for interworking between 3GPP and WLAN. The present invention provides a method and apparatus for defining a new automatic repeat request (ARQ) function for interworking between 3GPP and WLAN. The present invention provides a method and apparatus for performing routing to at least one of 3GPP or WLAN.

In an aspect, a method for routing, by a user equipment (UE), traffic in a wireless communication system is provided. The method includes transmitting information on the routing of the traffic to a network, and routing the traffic to at least one of 3rd generation partnership protocol (3GPP) long-term evolution (LTE) or wireless local area network (WLAN), according to the information on routing of the traffic.

In another aspect, a user equipment (UE) includes a memory, a transceiver, and a processor coupled to the memory and the transceiver, and configured to control the transceiver to transmit information on the routing of the traffic to a network, and route the traffic to at least one of 3rd generation partnership protocol (3GPP) long-term evolution (LTE) or wireless local area network (WLAN), according to the information on routing of the traffic.

Operations for tight interworking between 3GPP and WLAN can be performed efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
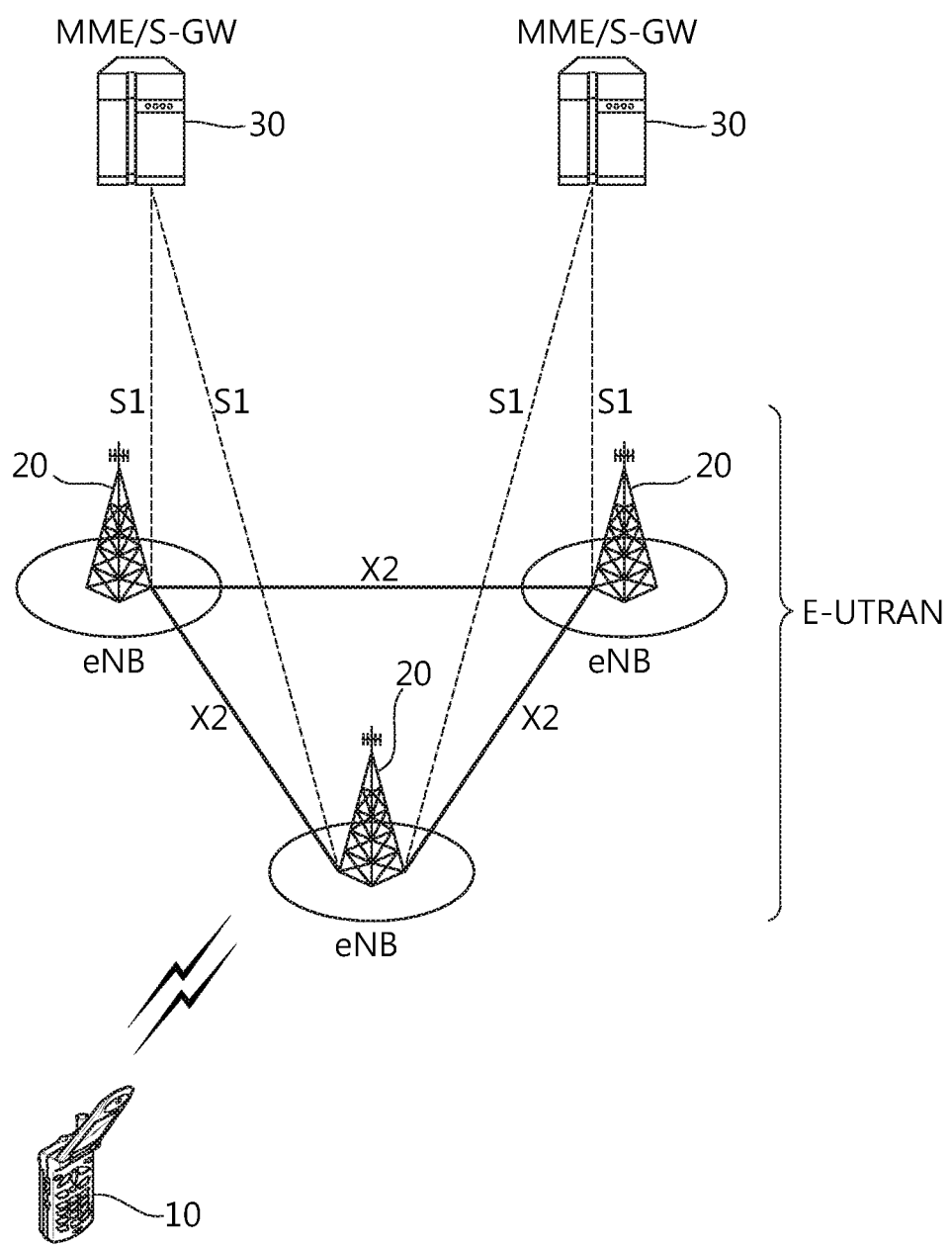
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
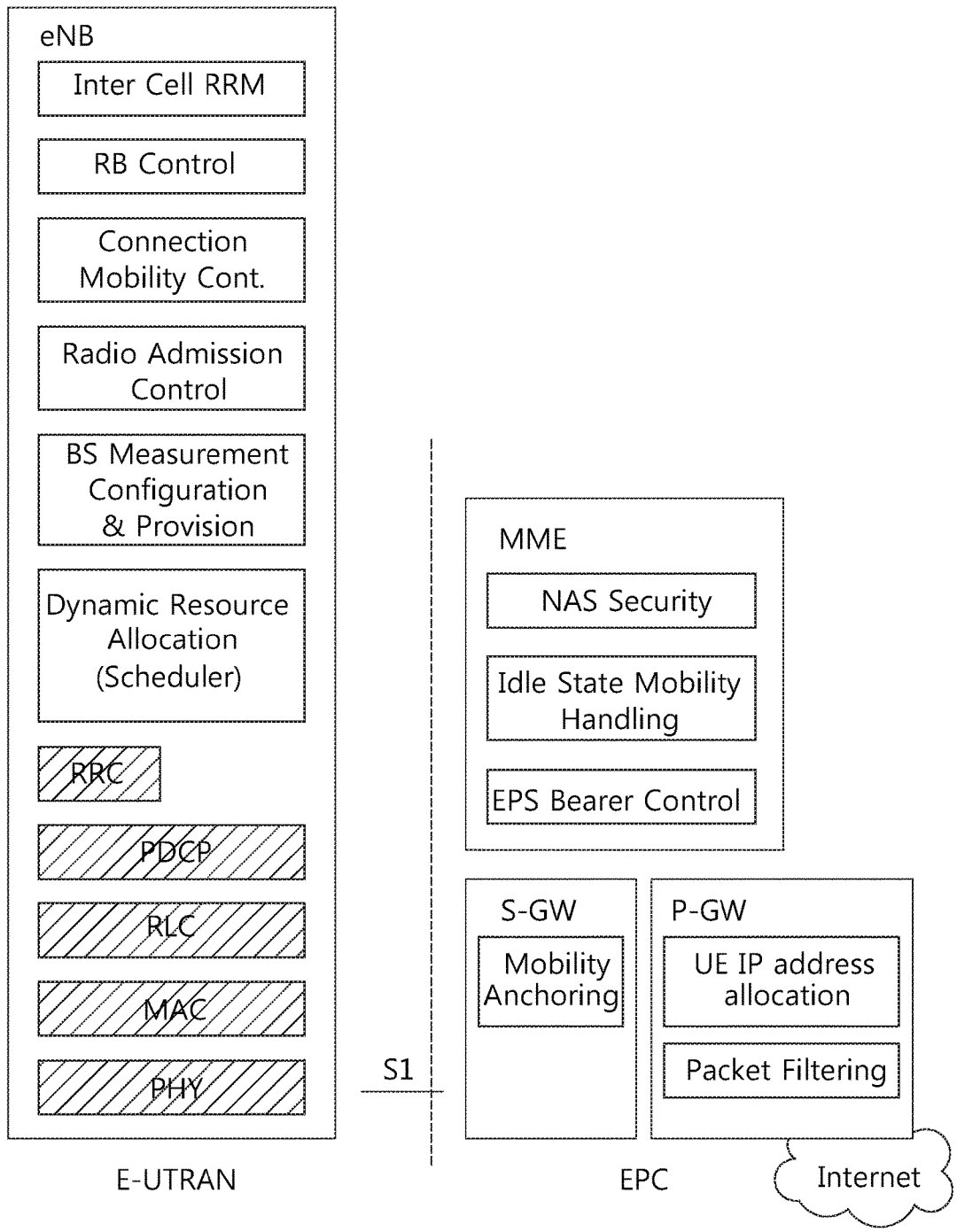
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
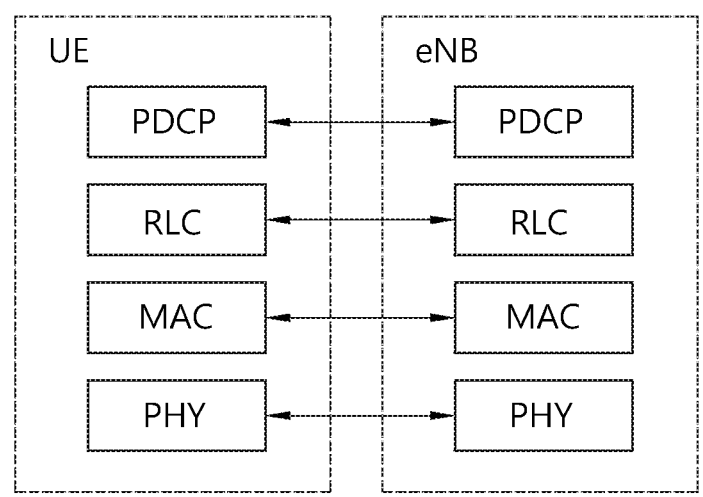
FIG. 3 shows a block diagram of a user plane protocol stack of an LTE system.
Figure 4:
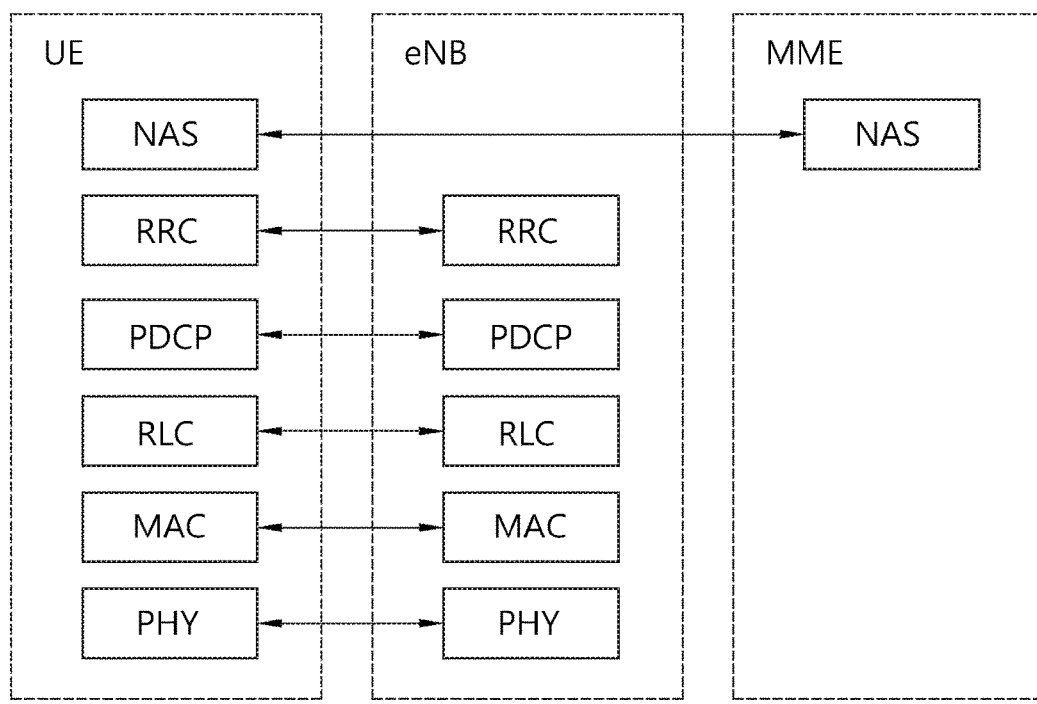
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
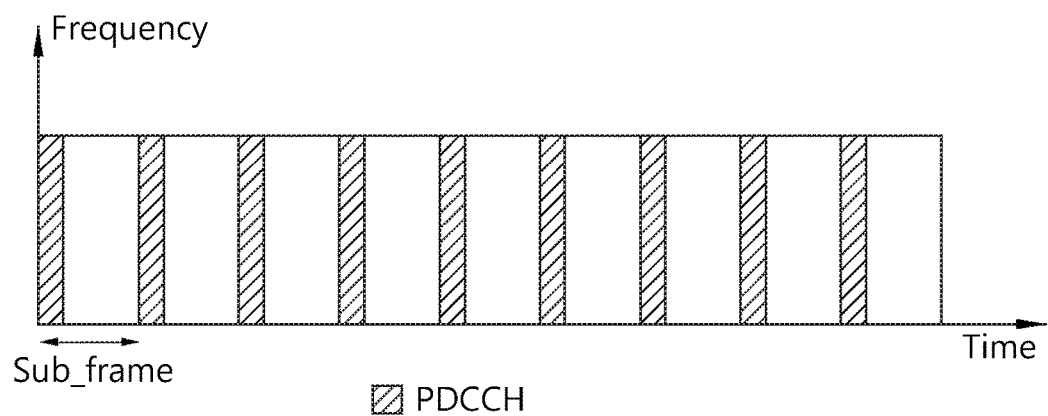
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Access network selection and traffic steering between E-UTRAN and WLAN is described. The mechanism to support traffic steering between E-UTRAN and WLAN may be described. Specifically, E-UTRAN assisted UE based bi-directional traffic steering between E-UTRAN and WLAN for UEs in RRC_IDLE and RRC_CONNECTED may be supported.

E-UTRAN provides assistance parameters via broadcast and dedicated RRC signaling to the UE. The RAN assistance parameters may include E-UTRAN signal strength and quality thresholds, WLAN channel utilization thresholds, WLAN backhaul data rate thresholds, WLAN signal strength and quality thresholds and offload preference indicator (OPI). E-UTRAN can also provide a list of WLAN identifiers to the UE via broadcast signaling. WLANs provided by E-UTRAN may include an associated priority. The UE uses the RAN assistance parameters in the evaluation of traffic steering rules or access network discovery and selection function (ANDSF) policies, for traffic steering decisions between E-UTRAN and WLAN. The OPI is only used in ANDSF policies. WLAN identifiers are only used in traffic steering rules.

If the UE is provisioned with ANDSF policies it shall forward the received RAN assistance parameters to upper layers, otherwise it shall use them in the traffic steering rules. The traffic steering rules are applied only to the WLANs of which identifiers are provided by the E-UTRAN. The UE in RRC_CONNECTED shall apply the parameters obtained via dedicated signaling if such have been received from the serving cell. Otherwise, the UE shall apply the parameters obtained via broadcast signaling. The UE in RRC_IDLE shall keep and apply the parameters obtained via dedicated signaling, until cell reselection or a timer has expired since the UE entered RRC_IDLE upon which the UE shall apply the parameters obtained via broadcast signaling. In the case of RAN sharing, each PLMN sharing the RAN can provide independent sets of RAN assistance parameters.

The UE indicates to upper layers when (and for which WLAN identifiers along with associated priorities, if any) access network selection and traffic steering rules are fulfilled. The selection among WLAN APs that fulfil the access network selection and traffic steering rules is up to UE implementation. When the UE applies the access network selection and traffic steering rules, it performs traffic steering between E-UTRAN WLAN with APN granularity.

Currently, core network for 3GPP LTE and WLAN are completely separated from each other. However, for efficient access network selection and traffic steering between E-UTRAN and WLAN, 3GPP LTE and WLAN may be tightly interworked. That is, the UE may be able to be served by 3GPP LTE and WLAN simultaneously in a scenario that 3GPP LTE is integrated with WLAN in the level of radio protocol. Specifically, it has been discussed that a specific bearer for WLAN is branched off from the layer 2 of the eNB.

Figure 6:
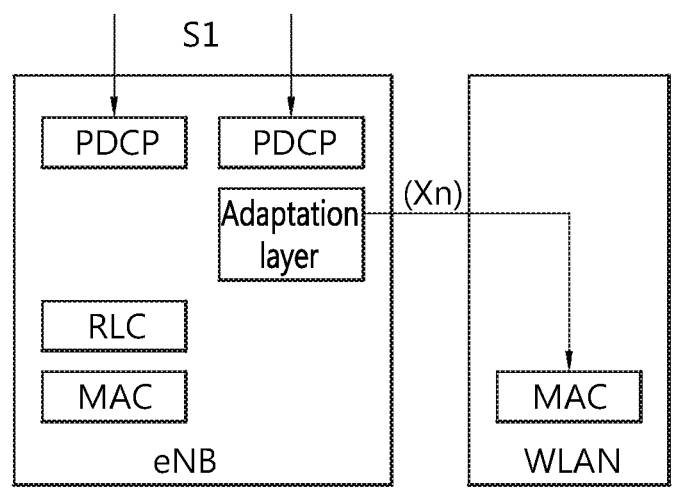
FIG. 6 to FIG. 10 shows an example of radio protocol architectures for tightly interworking between 3GPP LTE and WLAN.
Figure 7:
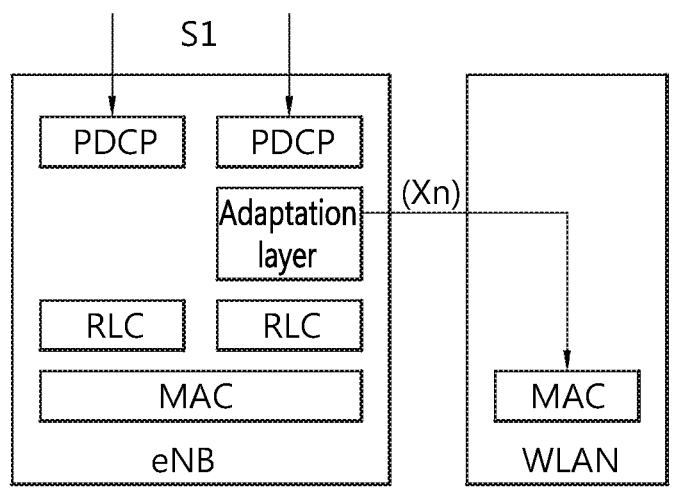
Figure 8:
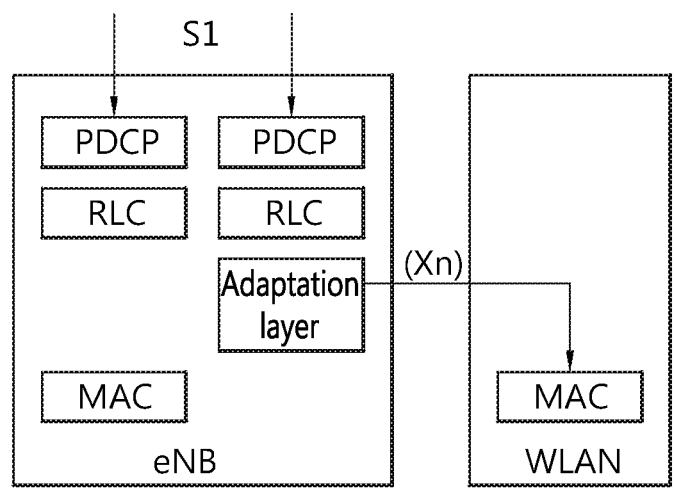
Figure 9:
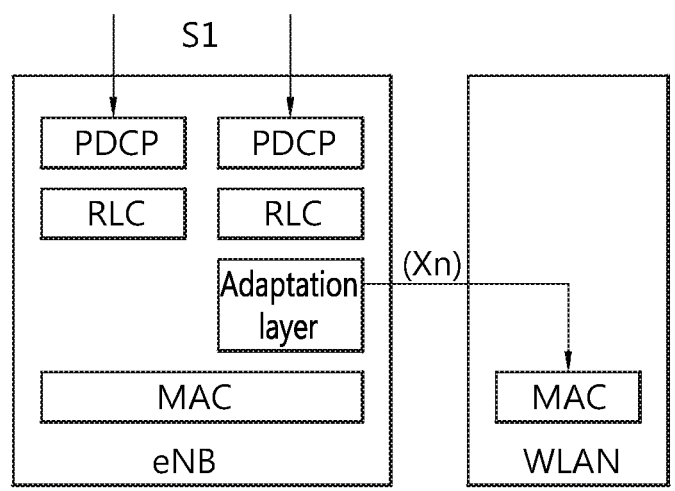
Figure 10:
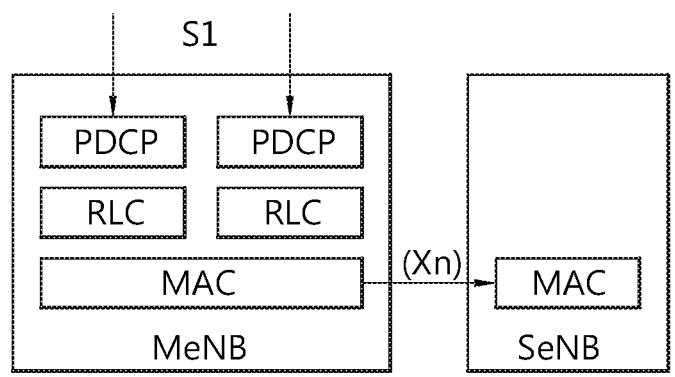

FIG. 6 to FIG. 10 shows an example of radio protocol architectures for tightly interworking between 3GPP LTE and WLAN. FIG. 6 shows an architecture in which the adaption layer of the 3GPP LTE is responsible for routing bearers, which goes through the PDCP entity, to 3GPP LTE/WLAN. FIG. 7 shows an architecture in which the adaption layer of the 3GPP LTE is responsible for routing packets/protocol data units (PDUs), which goes through the PDCP entity, to 3GPP LTE/WLAN. FIG. 8 shows an architecture in which the adaption layer of the 3GPP LTE is responsible for routing bearers, which goes through the PDCP/RLC entity, to 3GPP LTE/WLAN. FIG. 9 shows an architecture in which the adaption layer of the 3GPP LTE is responsible for routing packets/PDUs, which goes through the PDCP/RLC entity, to 3GPP LTE/WLAN. FIG. 10 shows an architecture in which the MAC layer of the 3GPP LTE is responsible for routing bearers/packets/PDUs, which goes through the PDCP/RLC entity, to 3GPP LTE/WLAN.

When 3GPP LTE and WLAN are tightly integrated as described above, due to characteristics of WLAN radio protocol, the network may not guarantee the quality of service (QoS) of the user traffic. Accordingly, operations for tight interworking between 3GPP LTE and WLAN may need to be newly defined.

Hereinafter, various operations for tight interworking between 3GPP LTE and WLAN according to an embodiment of the present invention are described. The embodiments of the present invention described below may apply to both UL transmission and DL transmission, unless explicitly stated otherwise.

(1) New Mode for Tight Interworking Between 3GPP LTE and WLAN

According to an embodiment of the present invention, a new mode for traffic which is served by the WLAN may be defined in the 3GPP LTE. In a new mode, the RLC entity may perform ARQ, but may not perform segmentation/concatenation/reassembly. Further, the PDCP entity may not perform security mechanism (e.g. ciphering, integrity protection) and/or may not perform header compression. According to an embodiment of the present invention, different modes may be applied to each of the split bearers.

The new mode may be configured for UE in RRC_CONNECTED by dedicated RRC signaling for the traffic which is transmitted/received over the WLAN, when WLAN is integrated with 3GPP LTE in the level of radio protocol, as described in FIG. 6 to FIG. 10. According to architecture, the adaption layer may or may not exist. Specifically, the UE may be configured to apply new PDCP mode over the bearers which utilize the resource/protocol for the WLAN (WLAN bearers) in architecture described in FIG. 6. Alternatively, the UE may be configured to apply new PDCP and/or RLC mode over the bearers which utilize the resource/protocol for WLAN (WLAN bearers) in architecture described in FIG. 8. Alternatively, the UE may be configured to apply new PDCP mode over the packets/PDUs which utilize the resource/protocol for WLAN in architecture described in FIG. 7. Alternatively, the UE may be configured to apply new PDCP and/or RLC mode over the packets/PDUs which utilize the resource/protocol for WLAN in architecture described in FIG. 9 and FIG. 10.

In addition, for the split bearer where the bearer is served by the 3GPP LTE as well as the WLAN as described in FIG. 9, one RLC entity may operate differently for traffic which is served by the WLAN and traffic which is served by the 3GPP LTE, respectively. For example, one RLC entity may perform ARQ, but may not perform segmentation/concatenation/reassembly for the traffic which is served by the WLAN. On the other hand, the RLC entity may perform ARQ and segmentation/concatenation/reassembly for the traffic which is served by the 3GPP LTE (by RLC acknowledged mode (AM)). For another example, one RLC entity may not perform segmentation/concatenation/reassembly for the traffic which is served by the WLAN (by RLC transparent mode (TM)). On the other hand, the RLC entity may perform segmentation/concatenation/reassembly for the traffic which is served by the 3GPP LTE (by RLC unacknowledged mode (UM)).

Likewise, for the split bearer where the bearer is served by the 3GPP LTE as well as the WLAN as described in FIG. 7, one PDCP entity may operate differently for traffic which is served by the WLAN and traffic which is served by the 3GPP LTE, respectively. For example, one PDCP entity may not perform security mechanism (e.g. ciphering) for the traffic which is served by the WLAN, while the PDCP entity may perform security mechanism for the traffic which is served by the 3GPP LTE. For another example, one PDCP entity may not perform header compression for the traffic which is served by the WLAN, while the PDCP entity may perform header compression for the traffic which is served by the 3GPP LTE.

(2) ARQ Function for Tight Interworking Between 3GPP LTE and WLAN

According to an embodiment of the present invention, in an architecture where RLC entity exists for the traffic which is served by the 3GPP LTE and/or the WLAN, and ARQ functionality is supported for both traffic, as described in FIG. 7 and FIG. 8, a new retransmission procedure in which the 3GPP LTE and the WLAN are combined may be performed. According to an embodiment of the present invention, different ARQ function may be applied to each of the split bearers.

For the first step, if the MAC entity of the WLAN in the UE fails to transmit the traffic with the configured (fixed) number of retransmission over the WLAN, the WLAN in the UE notifies failure information to the RLC entity of the UE of the 3GPP LTE, possibly through the adaption layer. The failure information may include an indication which means that the WLAN fails to transmit the traffic over the WLAN. The failure information may further include an indication which means that the WLAN fails to transmit the traffic with maximum retransmission over the WLAN. The failure information may also include a sequence number of the corresponding PDU.

For the second step, upon receiving the failure information, if the number of retransmission in the RLC entity in the UE is less than the (configured) maximum number of retransmission for the corresponding RLC PDU, the RLC entity retransmits the same RLC PDU via the WLAN. The configured maximum number of retransmission may or may not be different from the currently specified retransmission number in the RLC entity.

For the third step, for UL transmission, if the number of retransmission for the corresponding RLC PDU in the RLC entity over the WLAN reaches the maximum number of retransmission, the UE reports transmission failure to the network via 3GPP LTE. Upon detecting RLC maximum retransmission for the UL transmission via the WLAN, the UE stops transmitting over the WLAN. The reported information on the transmission failure may include an indication which means that the WLAN fails to transmit the traffic over the WLAN. The failure information may further include an indication which means that the WLAN fails to transmit the traffic with maximum retransmission over the WLAN. The failure information may also include a sequence number of the corresponding PDU, status of WLAN (RSSI of the WLAN, available backhaul data rate, channel utilization, etc.). The UE puts the corresponding PDU and subsequent PDUs in L2 buffer for the LTE and transmits the corresponding PDU and subsequent PDUs over the 3GPP LTE according to eNB's scheduling.

(3) Routing for Tight Interworking Between 3GPP LTE and WLAN

According to an embodiment of the present invention, for split bearers as described in FIG. 6 and FIG. 8, an entity (e.g. RLC/PDCP entity or adaption layer) responsible for routing the traffic to 3GPP LTE/WLAN in the UE or network determines the radio protocol among the 3GPP LTE and WLAN to serve the traffic. The routing may be performed per PDU. The amount of traffic to be routed over the 3GPP LTE and WLAN may be determined by various schemes as follows.

First, the amount of traffic to be routed over the 3GPP LTE and WLAN may be determined based on a requested ratio of amount of traffic to be served by the 3GPP LTE and WLAN by the UE. For DL transmission, the UE may request to the network a ratio of amount of traffic to be served from the eNB of the 3GPP LTE and amount of traffic to be served from the AP of the WLAN. The network transmits the traffic according to the requested ratio of amount of traffic to be served by the 3GPP LTE and WLAN. The entity responsible for routing the traffic in the network separates the total amount of traffic in the (re)transmission buffer (in PDCP/RLC entity or adaption layer) into two according to the ratio of amount of traffic to be served by the 3GPP LTE and WLAN. One is to be served over the 3GPP LTE and the other is to be served over the WLAN.

For UL transmission, the UE may request to the network a ratio of amount of traffic to be served from the eNB of the 3GPP LTE and amount of traffic to be served from the AP of the WLAN. Based the requested ratio, the network may optionally configure the ratio amount of traffic to be served from the eNB of the 3GPP LTE and amount of traffic to be served from the AP of the WLAN. The entity responsible for routing the traffic in the UE separates the total amount of traffic in the (re)transmission buffer (in PDCP/RLC entity or adaption layer) into two according to the requested (or configured if the network configures) ratio of amount of traffic to be served by the 3GPP LTE and WLAN. One is to be served over 3GPP LTE and the other is to be served over WLAN.

Second, the amount of traffic to be routed over the 3GPP LTE and WLAN may be determined based on an estimated WLAN throughput. For UL transmission, the WLAN module in the UE provides the estimated UL WLAN throughput to the entity responsible for routing the traffic in the UE. The entity responsible for routing the traffic in the UE may request the WLAN module to provide the estimated UL WLAN throughput periodically. The entity responsible for routing the traffic in the UE may configure the periodicity of provision of the estimated UL WLAN throughput. The value of periodicity may be interpreted as the minimum periodicity with which the WLAN module is required to provide the estimated UL WLAN throughput. The WLAN module may provide the estimated UL WLAN throughput to the entity responsible for routing the traffic in the UE, if the current estimated UL WLAN throughput is different from the previous one as much as the offset. If the current estimated UL WLAN throughput is the same as the previous one or different from the previous one within the offset, the WLAN module may not provide the estimated UL WLAN throughput to the entity responsible for routing the traffic in the UE. The entity responsible for routing the traffic in the UE routes the traffic, as much as (or, some portion of) the estimated UL WLAN throughput among the total amount of traffic in the (re)transmission buffer (in PDCP/RLC entity), over the WLAN during the unit time. The remaining amount of traffic is transmitted over the 3GPP LTE.

For DL transmission, the UE provides the estimated DL WLAN throughput to the network. The network may configure the UE to report the WLAN DL throughput. The configuration may include the periodicity of provision of the estimated DL WLAN throughput. The value of periodicity may be interpreted as the minimum periodicity with which the UE is required to provide the DL WLAN throughput. The UE may provide the estimated DL WLAN throughput to the network if the current estimated DL WLAN throughput is different from the previous one as much as the offset. If the current estimated DL WLAN throughput is the same as the previous one or different from the previous one within the offset, the UE may not provide the estimated DL WLAN throughput to the network. The offset may be configured or specified by the network. The network routes the traffic based on the reported estimated DL WLAN throughput.

Third, the amount of traffic to be routed over the 3GPP LTE and WLAN may be determined based on a configured WLAN throughput. For DL transmission, the UE may request to the network a preferred WLAN throughput. The network transmits the traffic according to the requested WLAN throughput. The entity responsible for routing the traffic in the network routes the traffic, as much as (or, some portion of) the requested WLAN throughput among the total amount of traffic in the (re)transmission buffer (in PDCP/RLC entity), over the WLAN during the unit time. The remaining amount of traffic is transmitted over the 3GPP LTE.

For UL transmission, the UE may request to the network a preferred WLAN throughput. Based the request WLAN throughput, the network may optionally configure the WLAN throughput for UL transmission. The entity responsible for routing the traffic in the UE routes the traffic, as much as (or, some portion of) the preferred WLAN throughput among the total amount of traffic in the (re)transmission buffer (in PDCP/RLC entity) over the WLAN during the unit time. The remaining amount of traffic is transmitted over the 3GPP LTE.

In case of UL transmission, the UE may request de-configuring of the WLAN to the network if the UE is already configured to transmit the traffic over the WLAN. For example, if the number of retransmission for the corresponding PDU in the RLC entity over the WLAN reaches the maximum number of retransmission, the UE may request de-configuring of the WLAN to the network. Alternatively, if the delay of the corresponding PDU which was transmitted over the WLAN is more than the (configured) threshold, the UE may request de-configuring of the WLAN to the network. Upon receiving the request, the network may de-configure the UE not to transmit the traffic over the indicated WLAN. Then, the UE may transmit the traffic over the 3GPP LTE. A message for request de-configuring of the WLAN may include at least one of a cause value, such as transmission failure after maximum retransmission, excessive delay over the threshold, etc., and WLAN information. The WLAN information may include at least one of WLAN identifiers, WLAN channel utilization, WLAN signal level (e.g. received signal strength indicator (RSSI), received channel power indicator (RCPI), received signal to noise indicator (RSNI)), or available backhaul data rate.

Figure 11:
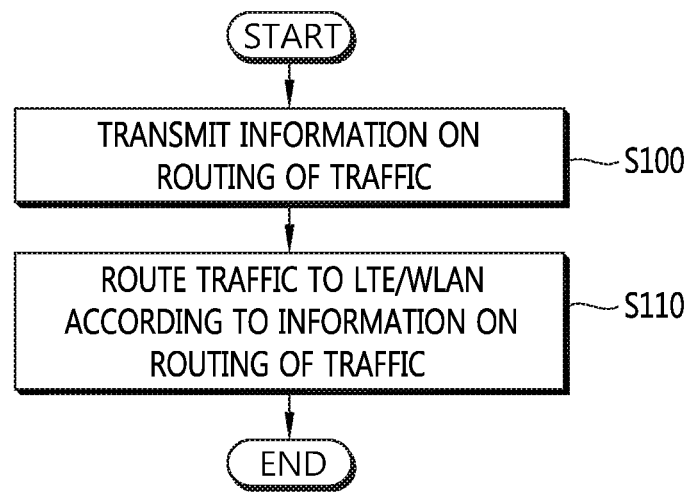
FIG. 11 shows an example of a method for routing traffic according to an embodiment of the present invention.

FIG. 11 shows an example of a method for routing traffic according to an embodiment of the present invention.

In step S100, the UE (i.e. RLC/PDCP entity or adaptation layer) transmits information on the routing of the traffic, i.e. DL traffic or UL traffic, to a network. In step S110, the UE routes the traffic to at least one of 3GPP LTE or WLAN, according to the information on routing of the traffic. The information on the routing of the traffic may be a ratio of an amount of the traffic to be served by the 3GPP LTE and an amount of the traffic to be served by the WLAN. In this case, the traffic may be routed for the 3GPP LTE and the WLAN, respectively, according to the ratio of the amount of the traffic to be served by the 3GPP LTE and the amount of the traffic to be served by the WLAN. Alternatively, the information on the routing of the traffic may be a preferred WLAN throughput. In this case, an amount of the traffic corresponding to the preferred WLAN throughput may be routed to the WLAN, and the remaining amount of the traffic may be routed to the 3GPP LTE. Alternatively, the information on the routing of the traffic may be an estimated DL WLAN throughput. The estimated DL WLAN throughput may be transmitted when the estimated DL WLAN throughput is different from previously estimated DL WLAN throughput as much as an offset. The traffic may be routed per PDU.

The UE may further request the network of de-configuring the WLAN, when a number of retransmissions over the WLAN reaches a maximum number of retransmission or a delay over the WLAN is larger than a threshold. A message for de-configuring the WLAN may include at least one of a cause value or WLAN information. The WLAN information may include at least one of WLAN identifies, a WLAN channel utilization, a WLAN signal level or available backhaul data rate.

Figure 12:
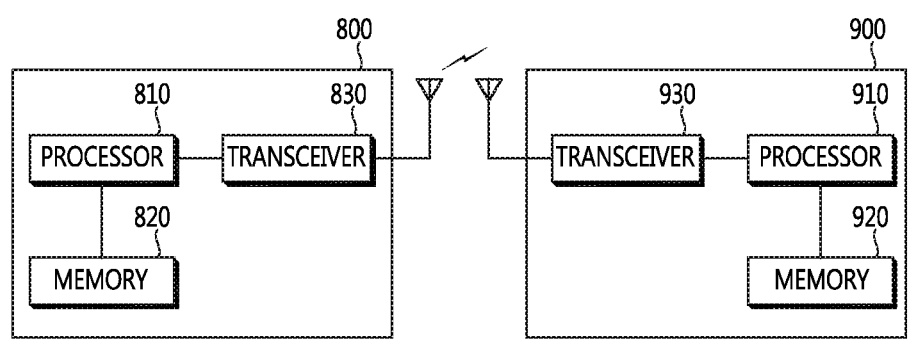
FIG. 12 shows a wireless communication system to implement an embodiment of the present invention.

FIG. 12 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for routing traffic in a wireless communication system, the method performed by a user equipment (UE) and comprising:
    requesting information from a network, the information related to preferred wireless local area network (WLAN) throughput for uplink (UL) transmission;
    receiving the requested information from the network;
    routing a portion of total UL traffic to the WLAN, the portion determined based on the preferred WLAN throughput;
    routing a remaining portion of the total UL traffic to a 3rd generation partnership protocol (3GPP) long-term evolution (LTE) network; and
    transmitting a message requesting the network to de-configure the WLAN when the routing of the portion and remaining portion of the UL traffic fails and a number of re-routings of the portion and remaining portion of the UL traffic reaches a maximum number,
    wherein the transmitted message includes a cause value informing that the number or re-routings reaches the maximum number.

2. The method of claim 1, wherein the transmitted message further includes WLAN information.

3. The method of claim 2, the WLAN information includes at least a WLAN identifier, a WLAN channel utilization, a WLAN signal level or an available backhaul data rate.

4. A user equipment (UE) for routing traffic in a wireless communication system, the UE comprising:
    a memory configured to store information;
    a transceiver configured to transmit and receive information; and
    a processor coupled to the memory and the transceiver and configured to:
    control the transceiver to request information from a network, the information related to preferred wireless local area network (WLAN) throughput for uplink (UL) transmission;
    control the transceiver to receive the requested information from the network;
    control the transceiver to route portion of total UL traffic to the WLAN, the amount determined based on the preferred WLAN throughput;
    control the transceiver to route a remaining portion of the total UL traffic to a 3rd generation partnership protocol (3GPP) long-term evolution (LTE) network; and
    control the transceiver to transmit a message requesting the network to de-configure the WLAN when the routing of the portion and remaining portion of the UL traffic fails and a number of re-routings of the portion and remaining portion of the UL traffic reaches a maximum number, and
    wherein the transmitted message includes a cause value informing that the number or re-routings reaches the maximum number.

5. The UE of claim 4, wherein the transmitted message further includes WLAN information.

6. The UE of claim 5, the WLAN information includes at least a WLAN identifier, a WLAN channel utilization, a WLAN signal level or an available backhaul data rate.

* * * * *